United States Patent
Weixler (10) Patent No.: US 10,857,608 B2
(45) Date of Patent: Dec. 8, 2020

(54) APPARATUS AND METHOD FOR CHAMFERING A WORKPIECE HAVING INTERNAL GEARING

(71) Applicant: Liebherr-Verzahntechnik GmbH, Kempten (DE)

(72) Inventor: Johannes Weixler, Durach (DE)

(73) Assignee: LIEBHERR-VERZAHNTECHNIK GMBH, Kempten (DE)

( * ) Notice: Subject to any disclaimer, the term of this patent is extended or adjusted under 35 U.S.C. 154(b) by 0 days.

(21) Appl. No.: 16/001,872

(22) Filed: Jun. 6, 2018

(65) Prior Publication Data

US 2018/0345393 A1 Dec. 6, 2018

(30) Foreign Application Priority Data

Jun. 6, 2017 (DE) .................. 10 2017 112 416

(51) Int. Cl.
 *B23F 19/10* (2006.01)
 *B23F 23/06* (2006.01)
 (Continued)

(52) U.S. Cl.
 CPC .......... *B23F 19/104* (2013.01); *B23F 19/102* (2013.01); *B23F 21/005* (2013.01);
 (Continued)

(58) Field of Classification Search
 CPC ...... B23F 19/102; B23F 19/105; B23F 19/10; B23F 19/101; B23F 19/104; B23F 19/107;
 (Continued)

(56) References Cited

U.S. PATENT DOCUMENTS

| 2,114,627 A | 4/1938 | Carlsen |
| 2,665,612 A | 1/1954 | Nübling |

(Continued)

FOREIGN PATENT DOCUMENTS

| CN | 103273142 A | 9/2013 |
| CN | 203449088 U | 2/2014 |

(Continued)

OTHER PUBLICATIONS

Weixler, J., "Apparatus and Method for Chamfering a Workpiece With Internal Gearing," U.S. Appl. No. 16/001,870, filed Jun. 6, 2018, 50 pages.

(Continued)

*Primary Examiner* — Nicole N Ramos
(74) *Attorney, Agent, or Firm* — McCoy Russell LLP (57) ABSTRACT

The present disclosure relates to an apparatus for chamfering at least one edge of the gearing at the front side of a workpiece having internal gearing comprising at least one rotatably supported workpiece holder for holding the workpiece and comprising at least one rotatably supported tool holder for holding at least one chamfer hob, possibly a chamfer cut hob, wherein the tool holder is arranged and/or arrangeable next to a workpiece held in the workpiece holder and a chamfer hob held in the tool holder is arrangeable by means of a tool arbor in the region of the center opening of the workpiece formed by the internal gearing to be brought into engagement with an edge of the internal gearing on the upper side and/or on the lower side of the workpiece.

21 Claims, 6 Drawing Sheets

(51) Int. Cl.
  *B23F 21/00* (2006.01)
  *B23Q 39/04* (2006.01)
  *B23F 21/16* (2006.01)

(52) U.S. Cl.
  CPC .............. *B23F 21/16* (2013.01); *B23F 23/06* (2013.01); *B23Q 39/048* (2013.01); *B23Q 2230/006* (2013.01)

(58) Field of Classification Search
  CPC ........ B23F 21/005; B23F 21/16; B23F 23/06; B23Q 2230/006; B23Q 39/048; Y10T 409/101113; Y10T 409/101272; Y10T 409/108427; Y10T 409/108586; Y10T 29/5124; Y10T 29/5196
  See application file for complete search history.

(56) References Cited

U.S. PATENT DOCUMENTS

| | | | |
|---|---|---|---|
| 3,570,367 | A | 3/1971 | Looman et al. |
| 3,673,660 | A | 7/1972 | Osplack et al. |
| 3,714,740 | A | 2/1973 | Steinhardt |
| 3,916,569 | A | 11/1975 | Wydler et al. |
| 3,931,754 | A | 1/1976 | Nishijima et al. |
| 4,130,967 | A | 12/1978 | Easton et al. |
| 6,227,775 | B1 | 5/2001 | Klammer |
| 7,103,793 | B2 | 9/2006 | Wolff et al. |
| 8,769,820 | B2 | 7/2014 | Philippin et al. |
| 2007/0020058 | A1* | 1/2007 | Peiffer .................. B23F 9/10 409/8 |
| 2011/0027031 | A1 | 2/2011 | Zeller |
| 2013/0121779 | A1 | 5/2013 | Geiser |
| 2013/0225379 | A1* | 8/2013 | Kato .................. B23Q 3/157 483/1 |
| 2014/0234043 | A1* | 8/2014 | Nakahara .............. B23F 5/20 409/12 |
| 2014/0294530 | A1 | 10/2014 | Geiser et al. |
| 2015/0360307 | A1* | 12/2015 | Vogel ................. B23F 21/005 700/114 |
| 2017/0008109 | A1 | 1/2017 | Wuerfel |
| 2017/0014924 | A1 | 1/2017 | Philippin |
| 2017/0072485 | A1 | 3/2017 | Weppelmann et al. |
| 2017/0252843 | A1* | 9/2017 | Matsubara .............. B23F 21/16 |
| 2018/0297134 | A1* | 10/2018 | Yoon .................... B23F 19/102 |
| 2018/0345392 | A1* | 12/2018 | Weixler ................ B23F 21/005 |
| 2019/0314910 | A1* | 10/2019 | Weixler ................ B23F 19/102 |
| 2019/0314911 | A1* | 10/2019 | Weixler ................ B23F 19/102 |

FOREIGN PATENT DOCUMENTS

| | | |
|---|---|---|
| DE | 736920 C | 7/1943 |
| DE | 8328237 U1 | 7/1984 |
| DE | 4122461 C1 | 7/1992 |
| DE | 19515043 A1 | 10/1996 |
| DE | 20320294 U1 | 4/2004 |
| DE | 10330474 A1 | 2/2005 |
| DE | 202007016740 U1 | 3/2008 |
| DE | 102008016497 A1 | 10/2009 |
| DE | 102009019433 A1 | 11/2010 |
| DE | 102012008296 A1 | 10/2013 |
| DE | 102013015240 A1 | 10/2014 |
| DE | 102015012190 B3 | 1/2017 |
| EP | 3012056 A1 | 4/2016 |
| JP | 2006224228 A | 8/2006 |
| JP | 2007030159 A | 2/2007 |
| WO | 2015185186 A1 | 12/2015 |

OTHER PUBLICATIONS

Japanese Patent Office, Office Action Issued in Application No. 2018-100569, dated Aug. 6, 2019, 8 pages.
Japanese Patent Office, Office Action Issued in Application No. 2018-100570, dated Aug. 6, 2019, 17 pages.
United States Patent and Trademark Office, Office Action Issued in U.S. Appl. No. 16/001,870, dated Dec. 6, 2019, 44 pages.
State Intellectual Property Office of the People's Republic of China, Office Action and Search Report Issued in Application No. 201810569135.8, dated May 21, 2020, 21 pages. (Submitted with Partial Translation).

* cited by examiner

APPARATUS AND METHOD FOR CHAMFERING A WORKPIECE HAVING INTERNAL GEARING

CROSS REFERENCE TO RELATED APPLICATIONS

The present application claims priority to German Patent Application No. 10 2017 112 416.0, entitled "APPARATUS AND METHOD FOR CHAMFERING A WORKPIECE HAVING INTERNAL GEARING," and filed on Jun. 6, 2017. The contents of the above-listed application is hereby incorporated by reference in its entirety for all purposes.

TECHNICAL FIELD

The present disclosure relates to an apparatus and to a method for chamfering at least one front-side edge of the gearing of a workpiece having internal gearing comprising at least one rotatably supported workpiece holder for holding the workpiece and comprising at least one rotatably supported tool holder for holding at least one chamfer hob. The chamfer hob can possibly be a chamfer cut hob.

BACKGROUND AND SUMMARY

On the machining of workpieces for manufacturing a gearing on the workpiece blank, sharp-edged material protrusions arise at the machined workpiece edges. These protrusions, called burrs, have to be removed by deburring the edges of the gearing since they are disruptive in the following processes or represent a risk of injury for the machine operator on a manual part handling. The edges of the gearing are additionally frequently also still provided with special protective chamfers.

The chamfering of the workpieces typically takes place by especially adapted deburring tools subsequent to the manufacture of the gearing on the workpiece blank. There are multiple methods for this chamfering process according to previous disclosures. The deburring method in accordance with DE8328237 A and chamfer cut deburring in accordance with DE20320294 A and DE202007016740 A are above all used in mass production.

DE20320294 A here shows the chamfer cut deburring using a so-called chamfer cut hob. Such a chamfer cut hob is a disk-shaped deburring tool that has cutting teeth and flutes at the periphery, possibly each having the same peripheral spacing. The cutting teeth have a helical extent in the peripheral direction. The chamfer cut hob has multiple threads, with one tooth being provided per thread. The cutting edges formed at the side of the teeth at the front in the direction of rotation are, however, disposed on a common circle of rotation.

The above-named chamfering methods are typically used for chamfering workpieces having an external gearing, for example in that the deburring tool is fixed on the same tool arbor together with the hobbing tool and is brought into engagement with the edges of the gearing after the hobbing process.

It is already known from DE 10 2013 015 240 A1 to use a chamfer hobbing station in which chamfer hobs, possibly chamfer cut hobs, are used as the only tools in the tool spindle. It is furthermore set forth there that the apparatus shown there for chamfering internal gearings can also be arranged within a workpiece having internal gearing. With larger internal gearings, the apparatus should be arranged within the toothed workpiece on a fixed position console at the center of the machine table or at a support above the machine table and should thus serve the chamfer machining of internal gearings. With internal gearings with smaller inside diameters, other embodiments may perform better.

It is the object of the disclosure to provide an improved apparatus and an improved method for chamfering the front-side edges of the gearing of a workpiece having internal gearing.

In an aspect, the present disclosure comprises an apparatus for chamfering at least one front-side edge of the gearing of a workpiece having internal gearing, wherein the apparatus comprises at least one rotatably supported workpiece holder for holding the workpiece and at least one rotatably supported tool holder for holding a chamfer hob, possibly a chamfer cut hob. In accordance with the disclosure, the first aspect of the present disclosure is wherein the tool holder is arranged and/or arrangeable next to a workpiece held in the workpiece holder, with a chamfer hob held in the tool holder being arrangeable by means of a tool arbor in the region of the center opening of the workpiece formed by the internal gearing to be brought into engagement with an edge of the internal gearing on the upper side and/or on the lower side of the workpiece.

The inventors of the present disclosure have recognized that it is not necessary for the chamfering of an internal gearing to arrange the whole apparatus by which the chamfering takes place within the center opening formed by the internal gearing. The inventors of the present disclosure have furthermore recognized that it is not even necessary to arrange the tool holder in this region.

The tool holder can rather be arranged in accordance with the disclosure next to the workpiece and only the chamfer hob can be arranged by means of a tool arbor in the inner region of the workpiece. It is hereby possible to use a conventionally designed hob head for the apparatus in accordance with the disclosure with only slight construction changes. Since the teeth of the chamfer hob arranged in the region of the center opening project beyond the radius of the tool arbor, they can dip into the center bore of the workpiece to machine the edges of the gearing while the tool arbor extends above or below the workpiece.

On the chamfering of an edge of the gearing, the tool arbor possibly extends, starting from the tool holder, past the upper side and/or lower side of the annular region of the workpiece having internal gearing from an outer region of the workpiece to the inner region of the workpiece.

The present disclosure here only requires a relatively long tool arbor so that it extends beyond the annular region of the workpiece having an internal gearing to arrange the chamfer hob in the inner region of the workpiece.

The length of the tool arbor from the tool holder up to at least one chamfer hob arranged on the tool arbor possibly amounts to at least 10% of the inner radius of the internal gearing of the workpiece, possibly to more than 20% and to at least 30%. The length amounts to more than 40% in an embodiment. If a plurality of chamfer hobs are provided on the tool arbor, these dimensional specifications possibly apply to the length of the arbor between the tool holder and the first chamfer hob facing the tool holder. The length of the arbor between two chamfer hobs arranged on the arbor further possibly amounts to at least 10% of the inner radius of the internal gearing of the workpiece, possibly to more than 20%, further possibly to at least 30% or 40%.

The tool holder can be arranged at a machining head arranged next to or above the workpiece holder in a possible embodiment and can be moved over it relative to the workpiece holder. The machining head is possibly arranged next to or above the workpiece holder at a machine column. The machine column can be arranged on a machine bed that also carries the workpiece holder.

The machining head possibly has a machine axis for moving the tool holder in the axial direction of the workpiece holder and/or a machine axis for traveling the tool holder in a direction perpendicular to the axis of rotation of the workpiece holder and/or to the axis of rotation of the tool holder.

The machining head can furthermore have a pivot axis for pivoting the tool holder about a pivot axis perpendicular to the axis of rotation of the tool holder and/or to the axis of rotation of the workpiece holder and/or can have a machine axis for shifting the tool holder in the direction of its axis of rotation.

The chamfer hob arranged at the tool arbor is possibly accessible from a lower side and/or an upper side.

When the present application speaks of an upper side or of a lower side of the workpiece or of an arrangement of components above, below or next to the workpiece, this does not mean that the workpiece holder has to have a vertical axis of rotation or that the upper side is arranged above the lower side in the vertical direction, or that a corresponding arrangement of the components actually takes place above or below the workpiece in the vertical direction or in a horizontal direction next to the workpiece.

These terms are rather only an indication of relative arrangements in a direction which is predefined by the axis of rotation of the workpiece and by which the upper side and the lower side of the workpiece are defined. Which side is considered the upper side of the workpiece and which the lower side is of no significance within the framework of the present disclosure.

Depending on the machine concept, an arrangement would, for example, also be conceivable in which the workpiece axis is arranged horizontally during machining, which would in turn require a horizontal alignment of the apparatus in accordance with the disclosure.

Alternatively or additionally, the tool holder can be arranged above a machining head at a machine column, with the machining head possibly extending away from the machine column perpendicular to the axis of rotation of the workpiece holder and/or to the axis of rotation of the tool holder. The axis of rotation of the tool holder hereby possibly extends at a certain distance from the machine column.

Further alternatively or additionally, the tool holder can be arranged at a machining head such that it extends in parallel with the front side of the machine column facing the tool holder.

The apparatus in accordance with the disclosure can possibly be designed such that the annular region of the workpiece that has internal gearing and that is chamfered by the chamfer hob extends in a region between the machine column and the axis of rotation of the tool holder below or above the tool arbor.

In an embodiment of the present disclosure, the apparatus in accordance with the disclosure has a sensor for threading and/or meshing the chamfer hob into the internal gearing of the workpiece.

Such a sensor is possibly required when the apparatus in accordance with the disclosure is designed as a stand-alone arrangement or when the workpiece whose edges are to be chamfered was previously arranged in a different workpiece holder during the manufacture of the gearing and is, for example, transported to the workpiece holder of the apparatus in accordance with the disclosure via a workpiece changer since in this case the position of the gearing relative to the apparatus is not known.

It is possibly a contactless sensor. An inductive sensor and/or an optical sensor can be used, for example.

The sensor for threading in and/or meshing the chamfer hob is possibly arranged at a separate arm via which it is traveled into the internal gearing. The arm for the sensor is possibly arranged together with the tool holder at a machining head of the apparatus and/or can be traveled over the same machine axes. An arrangement of the sensor outside the gearing would, for example, furthermore also be conceivable on the use of optical sensors.

In a second aspect, the present disclosure comprises an apparatus for chamfering at least one front-side edge of the gearing of a workpiece having internal gearing, wherein the apparatus comprises a first rotatably supported workpiece holder for holding the workpiece and at least one rotatably supported tool holder for holding at least one chamfer hob, possibly a chamfer cut hob. The second aspect of the present disclosure is wherein the apparatus has a second rotatably supported workpiece holder to hold the workpiece. The edge of the gearing can be chamfer machined on a first front side of the tool while the workpiece is held in the first workpiece holder and the edge on the second front side of the workpiece can be chamfer machined while the workpiece is held in the second workpiece holder.

The inventors of the present disclosure have recognized that the chamfer machining of the edges of the gearing both on the upper side and on the lower side of a workpiece having internal gearing held in a workpiece holder is particularly complicated since possibly the edge of the gearing on the side of the workpiece facing the tool holder is extremely difficult to access.

In accordance with the second aspect of the present disclosure, this problem is solved in that two workpiece holders are provided so that a respective edge can be chamfer machined that is arranged on the side remote from the workpiece holder and is therefore easily accessible.

The apparatus in accordance with the disclosure in accordance with the second aspect possibly has a machining head that is travelable over machine axes and that serves the chamfer machining of the edges of the gearing both on the first front side and on the second front side. The same machining head can therefore be used to machine both a workpiece that is held in the first workpiece holder and a workpiece that is held in the second workpiece holder. The same machine axes can possibly be used to carry out the chamfer machining.

The tool holder of the apparatus in accordance with the disclosure is possibly arranged at the machining head and can be traveled by its machine axes.

Alternatively or additionally, the chamfer machining of the edges of the gearing on the first or second front sides can take place via the same chamfer hob or via a plurality of chamfer hobs held in the same tool holder. The chamfer machining of the edges of the gearing on the first and second front sides of the workpiece possibly takes place via two separate chamfer hobs clamped on the same tool arbor.

The apparatus in accordance with the disclosure possibly has an apparatus for changing the workpiece from the first workpiece holder to the second workpiece holder and/or from the second workpiece holder to the first workpiece holder. The workpiece can therefore possibly be changed to the second workpiece holder after the edges of the gearing have been machined on a first front side while the workpiece had been held in the first workpiece holder in order to chamfer machine the edges of the gearing on the second front side.

The change possibly takes place such that the second front side of the workpiece faces the first workpiece holder while the workpiece is held therein and the first front side of the workpiece faces the second workpiece holder while the workpiece is arranged therein so that the respective other front sides are accessible and can be machined.

In a possible embodiment of the present disclosure, the apparatus for changing the workpiece can be provided in that one of the two workpiece holders is travelable such that it can grip a workpiece held in the other workpiece holder.

Alternatively or additionally, a workpiece changer can be provided for traveling the workpiece from the one workpiece holder to the other workpiece holder.

The rotary position of the workpiece on the workpiece transfer is possibly electronically transmitted from the first workpiece holder to the second workpiece holder so that the rotary position is known again after the workpiece transfer. A repeat threading process can possibly thus no longer be necessary to correctly position the chamfer hob for chamfering the gearing on the second front side of the workpiece.

In an embodiment of the present disclosure, the two workpiece holders are arranged or arrangeable on two oppositely disposed sides of a work region. Depending on which workpiece holder the workpiece is held in, its first front side or second front side possibly faces the work region. The chamber hob or hobs are possibly or will possibly be arranged in the work region to machine the respective edges of the gearing on the front sides facing the work region.

In a possible embodiment of the present disclosure, the two workpiece holders have parallel axes of rotation. The two workpiece holders are possibly arranged coaxially. The one tool holder is in this case possibly travelable in the direction of its axis of rotation to the other workpiece holder to take over the workpiece.

The first and second aspects of the present disclosure can be implemented independent of one another and separately.

The two aspects of the present disclosure are, however, possibly combined in an apparatus. The chamfer machining of a workpiece held in the first workpiece holder and/or in the second workpiece holder of an apparatus in accordance with the second aspect of the present disclosure can possibly take place in accordance with the first aspect.

The tool holder is possibly arranged and/or arrangeable next to the two workpiece holders, with at least one chamfer hob being arrangeable by means of a tool arbor above the center opening of the workpiece formed by the internal gearing if said workpiece is arranged in the first workpiece holder to be brought into engagement with an edge of the gearing on the upper side of the workpiece. A chamber hob can furthermore be arrangeable by means of a tool arbor below the center opening formed by the internal gearing when it is arranged in the second workpiece holder to be brought into engagement with an edge of the gearing on the lower side of the workpiece. The same tool holder is possibly used for the chamfer machining of the edges of the gearing on the upper side and on the lower side.

In a first alternative of the present disclosure, separate chamfer hobs that are possibly arranged on the same tool arbor are used for machining the edges of the gearing on the upper side and on the lower side.

Work is possibly carried out for the machining of the edges of the gearing on the upper side and on the lower side with opposite directions of rotation of the tool holder to achieve the same cutting direction between the tool and the workpiece on the chamfering of the edges on the upper side and on the lower side. The direction of rotation can possibly be selected such that a machining takes place from the front sides into the gearing both on the chamfering of the edges of the gearing on the upper side and on the chamfering of the edges of the gearing on the lower side or the direction of rotation is selected such that a respective machining of the edges of the gearing takes place with a cutting direction from the gearing in the direction toward the front sides. This has the advantage that burrs remaining during chamfering either remain only on the front sides or only within the gearing. The direction of rotation of the respective workpiece holder is correspondingly adapted to the direction of rotation of the chamfer hob.

Alternatively, the same chamfer hob can be used for machining the edges of the gearing on the upper side and on the lower side. In a first alternative, it can be brought into engagement with the edge of the gearing on the upper side and on the lower side in the same radial region of the workpiece. However, this has the disadvantage that respective different cutting directions are present on the chamfer machining of the edges of the gearing on the upper side and on the lower side.

The chamfer hob is therefore possibly brought into engagement with an edge region of the gearing on a first side of the workpiece with a first radial direction with respect to the axis of rotation of the workpiece and, after the change of the workpiece into the second workpiece holder by traveling the tool holder in a second radial direction with respect to the axis of rotation of the workpiece, is brought into engagement with a radially oppositely disposed edge region of the gearing on the second side of the workpiece. This has the advantage that the same cutting direction with respect to the workpiece in turn results on both sides. The direction of rotation of the tool holders on the change of the engagement points has to be adapted here.

The chamfer hob or hobs arranged on a tool arbor are possibly accessible from two sides to be able to respectively be brought into engagement with an edge of the workpiece. They are possibly accessible both from the upper side and from the lower side.

The apparatus in accordance with the disclosure are typically used in high volume production and possibly in mass production. The machining of the workpieces and thus also the chamfering process in this case take place in an automated manner by the control of the apparatus.

The apparatus in accordance with the disclosure therefore possibly have a control for an automatic control of the machine axes of the apparatus for chamfering the edge of the gearing on at least one front side and possibly on both front sides of a workpiece.

The control of the apparatus is possibly programmed such that the apparatus in accordance with the disclosure automatically carry out the steps described above with respect to their operation and/or use.

The control possibly has a microprocessor and a memory in which a control program for controlling the apparatus is stored which is worked through by the microprocessor.

The present disclosure initially includes an apparatus such as has been described in more detail above that is suitable for holding a chamfer hob and possibly a chamfer cut hob in the tool holder and for carrying out the above-described applications.

The present disclosure, however, likewise comprises an apparatus such as has been described above in which at least one chamfer hob is held in the tool holder or in which with a plurality of tool holders respective chamfer hobs are held therein. Chamfer cut hobs are possibly held in the tool holder or tool holders.

The present disclosure further relates to a gear manufacturing machining center having an apparatus such as was described above, a gear cutting machine, and a workpiece changer. The gear cutting machine is possibly a machine for machining internal gearings, possibly a milling machine or a chamfer cut deburring device or a skiving machine. The gear manufacturing machining and the chamfering of the workpieces possibly take place in the gear manufacturing machining center with parallel cycle times. Workpieces gear manufactured by the gear manufacturing machine are possibly transported via the workpiece changer to the apparatus for chamfering in accordance with the present disclosure to be chamfered, while the next workpiece is already being gear manufactured on the gear manufacturing machine. A chamfering of the workpiece is also conceivable between a rough machining step and a fine machining step for which purpose the workpiece is possibly traveled from the gear manufacturing machine to the apparatus in accordance with the disclosure and back again.

The workpiece changer is possibly a ring automation, with further possibly the apparatus in accordance with the disclosure for chamfering and the gear manufacturing machine being arranged at different angular positions of the ring automation.

The gear manufacturing machine and the apparatus in accordance with the disclosure possibly have separate workpiece holders. The workpiece changer in this case changes a workpiece after the gear manufacturing machining of the gear manufacturing machine from the workpiece holder there to the workpiece holder of the apparatus for chamfering in accordance with the disclosure.

In an alternative embodiment, the gear manufacturing machining center can, however, also have a plurality of workpiece holders in which the workpieces remain for the gear manufacturing machining and the chamfer machining. In this case, the workpiece holders are possibly moved from the gear manufacturing machine to the apparatus in accordance with the disclosure and/or vice versa.

The workpiece changer is possibly used to place workpieces from an external transport path or from other machining stations onto the workpiece holder or workpiece holders and to remove them therefrom.

In accordance with a further aspect of the present disclosure, the apparatus in accordance with the disclosure can also be designed as a separate machine. It possibly receives gear machined workpieces from a transport path and/or from an automation to chamfer machine them. The correspondingly machined workpieces are then possibly again transferred to a transport path and/or automation again.

The present disclosure also comprises corresponding methods in addition to the apparatus in accordance with the disclosure. The present disclosure possibly also comprises those methods that have been described above with respect to the apparatus in accordance with the disclosure.

In a development of the first aspect, the present disclosure also comprises, independently of this, a method of chamfering at least one front-side edge of the gearing of a workpiece having internal gearing by a chamfer hob, possibly a chamfer cut hob, held in a rotatably supported tool holder. The method in accordance with the disclosure is wherein the tool holder is arranged next to a workpiece held in a workpiece holder and the chamfer hob held in the tool holder is arranged via a tool arbor in the region of the center opening formed by the internal gearing to be brought into engagement with an edge of the gearing on the upper side and/or on the lower side of the workpiece.

The method in accordance with the disclosure possibly takes place such as was presented in more detail above with respect to the apparatus in accordance with the first aspect of the present disclosure. The method in accordance with the disclosure can possibly be carried out using such an apparatus.

In accordance with the second aspect, the present disclosure comprises a method of chamfering at least one front-side edge of the gearing of a workpiece having internal gearing by a chamfer hob, possibly a chamfer cut hob, held in a rotatably supported tool holder. Provision is made in accordance with the second aspect that the edge of the gearing is chamfer machined on a first front side of the workpiece while the workpiece is held in a first workpiece holder and the edge of the gearing on a second front side of the workpiece is chamfer machined while the workpiece is held in a second workpiece holder.

This method possibly also takes place such as has already been shown in more detail above with respect to the apparatus in accordance with the disclosure in accordance with the second aspect. The method possibly takes place using such an apparatus.

The methods in accordance with the first and second aspects of the present disclosure are possibly used in combination.

The present disclosure furthermore comprises the use of a chamfer hob, possibly the use of a chamfer cut hob, for carrying out one of the methods in accordance with the disclosure such as were presented above.

The present disclosure furthermore comprises the use of a chamfer hob, possibly of a chamfer cut hob, in one of the apparatus in accordance with the disclosure such as were described above.

The methods and apparatus in accordance with the disclosure are possibly used for chamfering the edges of spur gearings.

The workpieces in accordance with the disclosure are possibly gears, possibly gears having an internal gearing. Such gears having an internal gearing possibly have an annular shape, with the internal gearing being arranged at the inner annular surface.

The chamfering possibly takes place in accordance with the present disclosure via a chamfer cut hob. The chamfer cut hob can possibly be designed like the deburring tool that is described in DE 10330474 A1. The chamfering further possibly takes place by means of the chamfer cut hob such as is likewise described in DE 10330474 A1 for the deburring process.

Unlike as shown in DE 10330474 A1, the chamfer cut hob is possibly not clamped on the same tool arbor as part of the current disclosure with the tool that is used to manufacture the gearing, but rather in a separate tool holder, possibly as the only tool in a separate tool holder.

BRIEF DESCRIPTION OF THE FIGURES

The present disclosure will now be explained in more detail with reference to embodiments and to drawings:
There are shown.

DETAILED DESCRIPTION

The embodiment of an apparatus in accordance with the disclosure described in FIGS. 1 to 5 and the method carried out by this apparatus implement both the first aspect and the second aspect of the present disclosure. The features of the embodiment described with respect to the first and second aspects can, however, also be implemented separately in each case and per se and without the respective other aspect.

Figure 1:
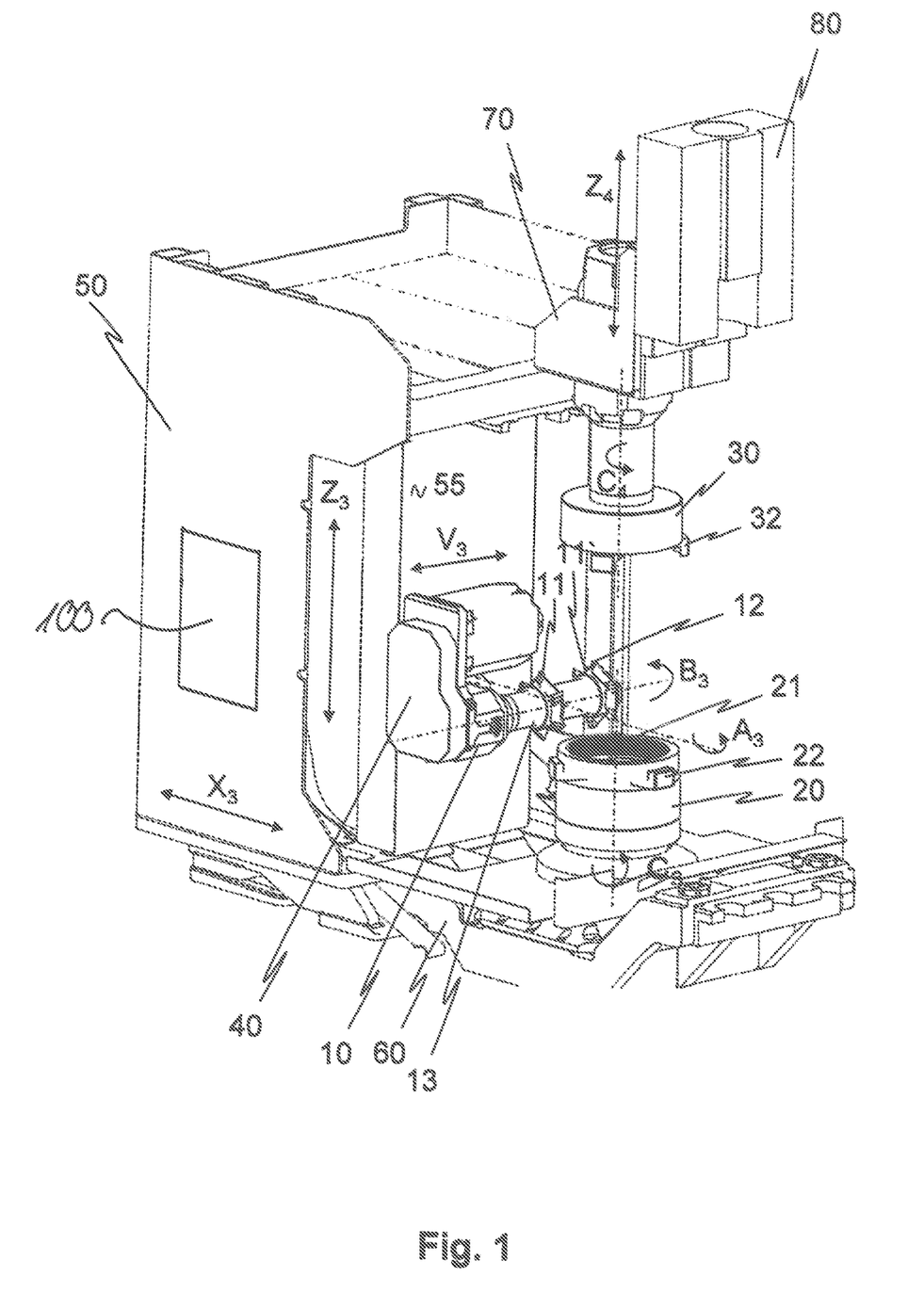
FIG. 1: an embodiment of an apparatus in accordance with the disclosure for chamfering the edges of the gearing of a workpiece having internal gearing in which both aspects of the present disclosure are implemented.

An apparatus in accordance with the disclosure for chamfering the edges of the gearing of a workpiece 21 having internal gearing is shown in FIG. 1. The apparatus has a tool holder 10 in which at least one chamfer hob 11, 11' is held via a tool arbor 13. A workpiece holder 20 is furthermore provided via which the workpiece 21 is held so that the edge of the gearing can be chamfer machined on at least one front side of the workpiece 21 by a chamfer hob 11, 11' held in the tool holder 10. The chamfer hob is possibly brought into engagement with the edge for this purpose and the rotary movement of the tool holder 10 is synchronized with the rotary movement of the workpiece holder 20 so that the chamfer hob machines the edge of the gearing of the workpiece. The apparatus includes a controller 100 schematically shown in FIG. 1 for controlling the machine axes of the apparatus.

In accordance with the first aspect of the present disclosure, the tool holder 10 is arranged outside the workpiece 21, but the chamfer hob 11 or 11' for chamfering the edge region is arranged by means of the tool arbor 13 in the region of the center opening of the workpiece 21. As can possibly be seen from FIG. 2, the tool arbor 13 extends for this purpose, starting from the tool holder 10 arranged next to the workpiece holder 20, beyond the annular toothed region of the workpiece into the region of the center opening of the workpiece so that the chamfer hob is arranged in this region and machines the edge from there.

Figure 2:
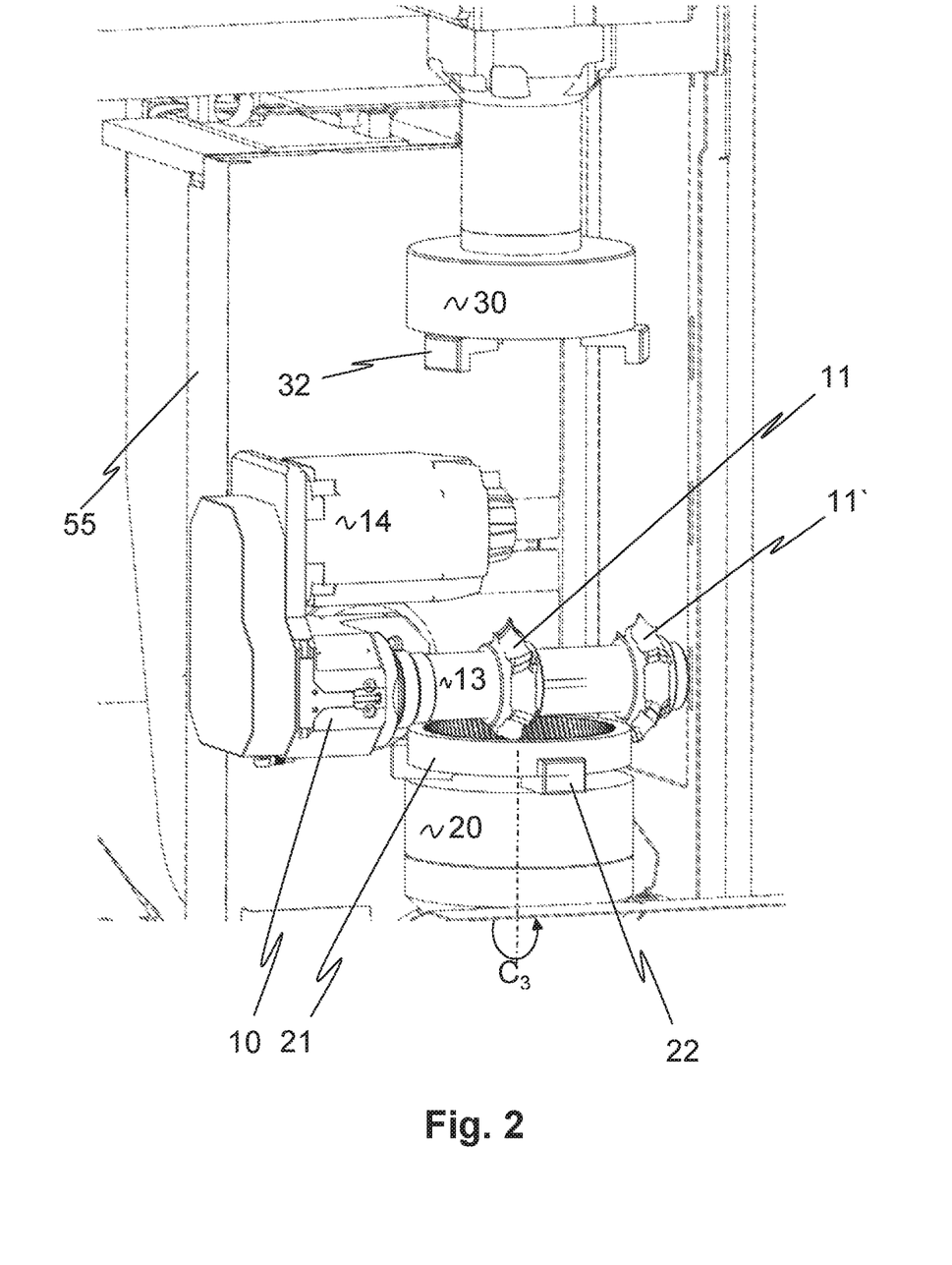
FIG. 2: the chamfering of the edge of the gearing on an upper side of the workpiece while it is held in the first workpiece holder.

In the embodiment shown in FIG. 2, the chamfer hob 11 is arranged in a region above the center bore for this purpose and the tool holder is arranged in a region next to and slightly above the workpiece holder 20. Since the teeth 12 of the chamfer hob 11 project beyond the radius of the tool arbor 13, they can dip into the center bore of the workpiece 21 to machine the edges of the gearing.

In the machining process shown in FIG. 2, the lower side of the workpiece 21 is directed to the workpiece holder 20 while the edge of the gearing is gear manufacturing machined on the upper side by the chamfer hob 11. The chamfer hob engages into the center opening of the workpiece 21 from above for this purpose. The tool arbor 13 extends above the upper side of the workpiece 21 beyond the annular region of the workpiece.

Figure 4:
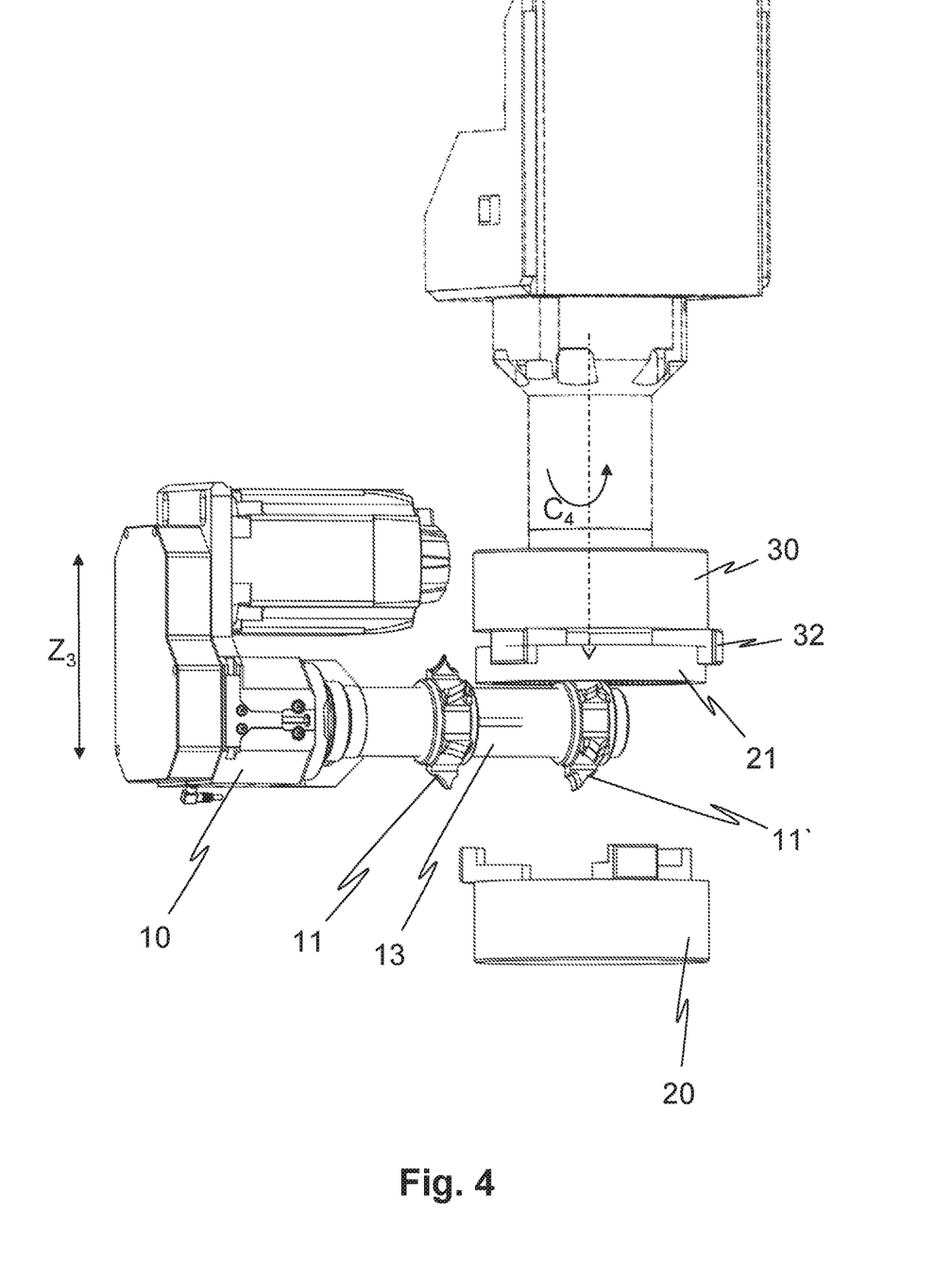
FIG. 4: the chamfering of an edge of the gearing on a lower side of the workpiece while it is held in the second workpiece holder.
Figure 5:
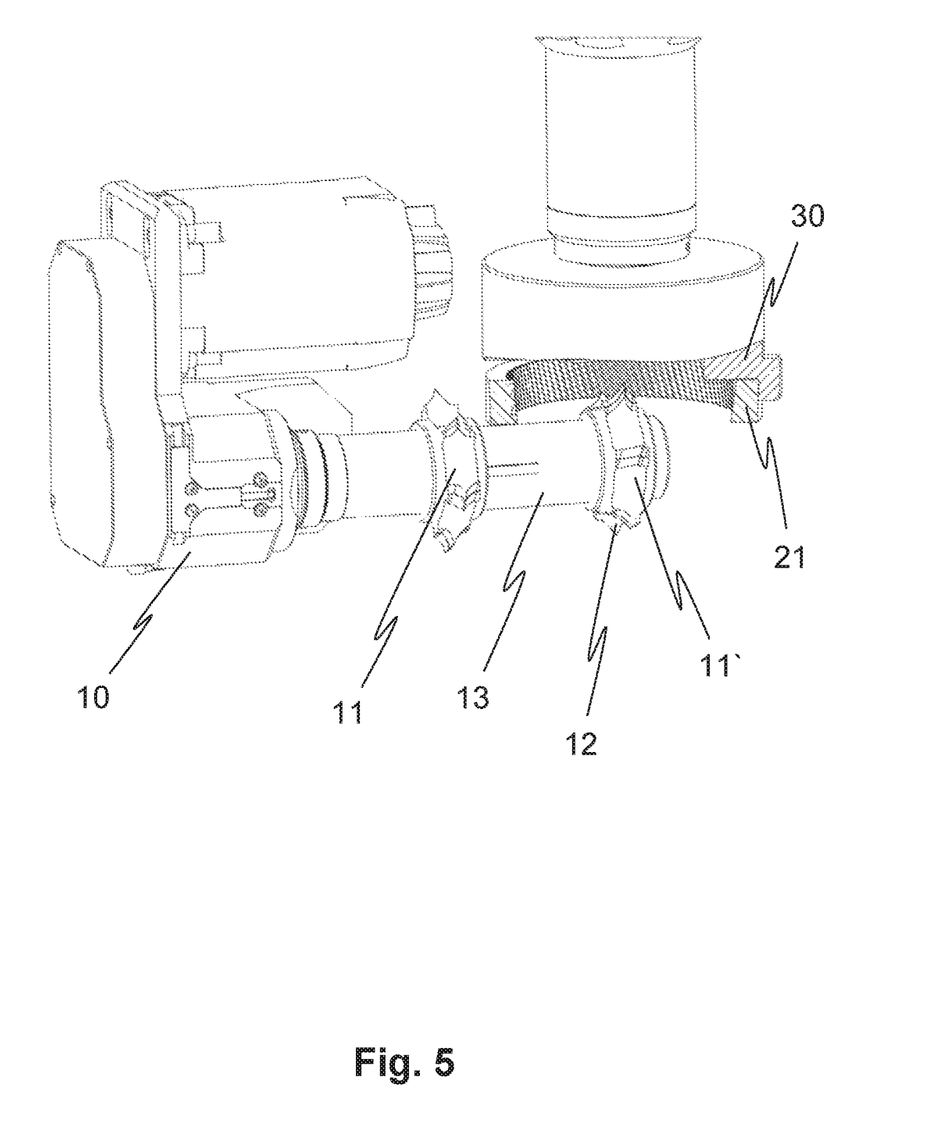
FIG. 5: the machining shown in FIG. 4 in a partial sectional view through the workpiece.

As can be seen in FIGS. 4 and 5, for example, a machining of the edges of the gearing on the lower side of a workpiece that is accordingly arranged above the tool arbor 13 or the chamfer hob 11' is also possible in the same manner. This will be described in even more detail in the following in connection with the second aspect of the present disclosure, but is naturally also possible within the framework of the first aspect.

In the embodiment shown in FIG. 1, the tool holder 10 is arranged along machine axes.

The machining head 40 is arranged at a machine column 55 in the embodiment. This machine column 55 is arranged within a frame 50 that is provided next to the workpiece holder 20 on a common console 60 by which the unit is fastened to the machine bed. The machine axes for moving the machining head 40 in the embodiment comprise an X3 axis by which the machining head can be traveled in a direction perpendicular to the axis of rotation C3 of the workpiece holder 20 and to the axis of rotation B3 of the tool holder 10 and a Z3 axis via which the machining head can be traveled in a direction in parallel with the axis of rotation C3 of the workpiece holder 20.

A pivot axis A3 is furthermore provided via which the machining head can be pivoted about an axis that stands perpendicular on the axes of rotation B3 and C3 of the tool holder 10 and the workpiece holder 20. A shift axis V3 is furthermore provided that permits a shifting of the tool holder 10 in the direction of its axis of rotation B3. Alternatively, a Y3 axis would also be conceivable via which the machining head 40 can be traveled in a direction perpendicular to the X3 axis and to the Z3 axis.

The axes X3, Z3, and V3 are possibly linear axes that can be implemented via slides, for example.

Other mechanical axes for traveling the machining head are, however, also conceivable. It is furthermore conceivable to dispense with individual axes shown in the embodiment.

The tool holder 10 is arranged together with its drive 14 at the machining head 40 in the embodiment. The arrangement takes place such that the axis of rotation B3 of the tool holder extends spaced apart from the front side of the machine column 55 facing the workpiece, and indeed in a plane that stands perpendicular on the X3 axis.

Such a configuration of the machining head and of the workpiece holder is also typical in machining heads for workpieces having external gearing.

Unlike in the machining of workpieces having external gearing, the engagement with the workpiece does not, however, take place on the side of the chamfer hob remote from the machine column 55, but rather on the side of the chamfer hob facing the machine column 55.

An accessibility of the chamfer hob held in the tool holder 10 is required for this purpose. The annular region of the workpiece 21 to be machined possibly has to extend, for the machining of the edges of the internal gearing, in the radial direction with respect to the axis of rotation C3 of the workpiece holder on the side of the chamfer hob 11 facing the machine column 55.

The annular region of the workpiece 21 to be machined can extend between a front side of the machine column 55 facing the workpiece and the chamfer hob. Alternatively or additionally, the arbor 13 can also be designed as so long that the chamfer hob 11 or 11' is located in the direction of the V3 axis in front of a side surface of the machine column 55. The annular region of the workpiece 21 to be machined can hereby extend next to the machine column 55.

In accordance with the disclosure, however, other arrangements of the machining head and/or of the tool holder 10 would also be conceivable as long as a corresponding accessibility of the chamfer hob or hobs held in the tool holder is provided.

The apparatus in accordance with the disclosure possibly has a sensor, not shown in the embodiment, for threading and/or meshing the chamfer hob into the internal gearing of the workpiece. It is possibly a contactless sensor. An inductive sensor and/or an optical sensor can be used, for example.

The sensor for threading and/or meshing the chamfer hob is possibly arranged at a separate arm via which it can be traveled into the internal gearing of the workpiece 21 held in the workpiece holder 20. The arm for the sensor is possibly arranged at the machining head 40 and/or at the machine column 55 of the apparatus and can be traveled over its machine axes.

The embodiment of the present disclosure in accordance with the first aspect described up to now initially only serves the machining of the edge on a first front side of the workpiece held in the workpiece holder 20, and indeed on the front side remote from the workpiece holder 20, on the upper side in the embodiment.

It is, however, possible by combination with an embodiment in accordance with the second aspect of the present disclosure, to chamfer machine the edges of the gearing both on the upper side and on the lower side of the workpiece. The second aspect can, however, also be implemented independently of the first aspect.

In accordance with the second aspect of the present disclosure, the apparatus in accordance with the disclosure comprises a second workpiece holder 30 in addition to the first workpiece holder 20 to be able also to chamfer machine the edges of the gearing both on the upper side and on the lower side of the workpiece.

In the embodiment, the edge of the gearing on the upper side of the workpiece 21 is chamfer machined while it is held in the first workpiece holder 20 and the edge of the gearing on the lower side of the workpiece 21 is chamfer machined while it is arranged in the second workpiece holder 30. The workpiece 21 is accordingly held in the first workpiece holder 20 so that its lower side is directed toward the workpiece holder 20 while the upper side is freely accessible and is held in the second workpiece holder 30 so that its upper side is directed toward the second workpiece holder 30 and the lower side is freely accessible.

The two workpiece holders are arranged opposite to one another such that one machining head is sufficient to machine both a workpiece that is held in the first workpiece holder 20 and a workpiece that is held in the second workpiece holder 30.

The same tool holder can possibly be used for both chamfer machining steps.

After the machining of the edge of the gearing on one side of the gearing, a change of the workpiece from the one workpiece holder to the other workpiece holder takes place. Which side is machined first can be selected as desired.

In the embodiment, the axes of rotation C3 and C4 of the first and second workpiece holders 20 and 30 are arranged in parallel and are aligned with one another.

The change of the workpiece from one workpiece holder to the other workpiece holder is realized in the embodiment shown in FIGS. 1 to 6 in that the second workpiece holder 30 is travelable over a travel axis Z4 that extends in parallel with the axis of rotation C4.

Figure 3:
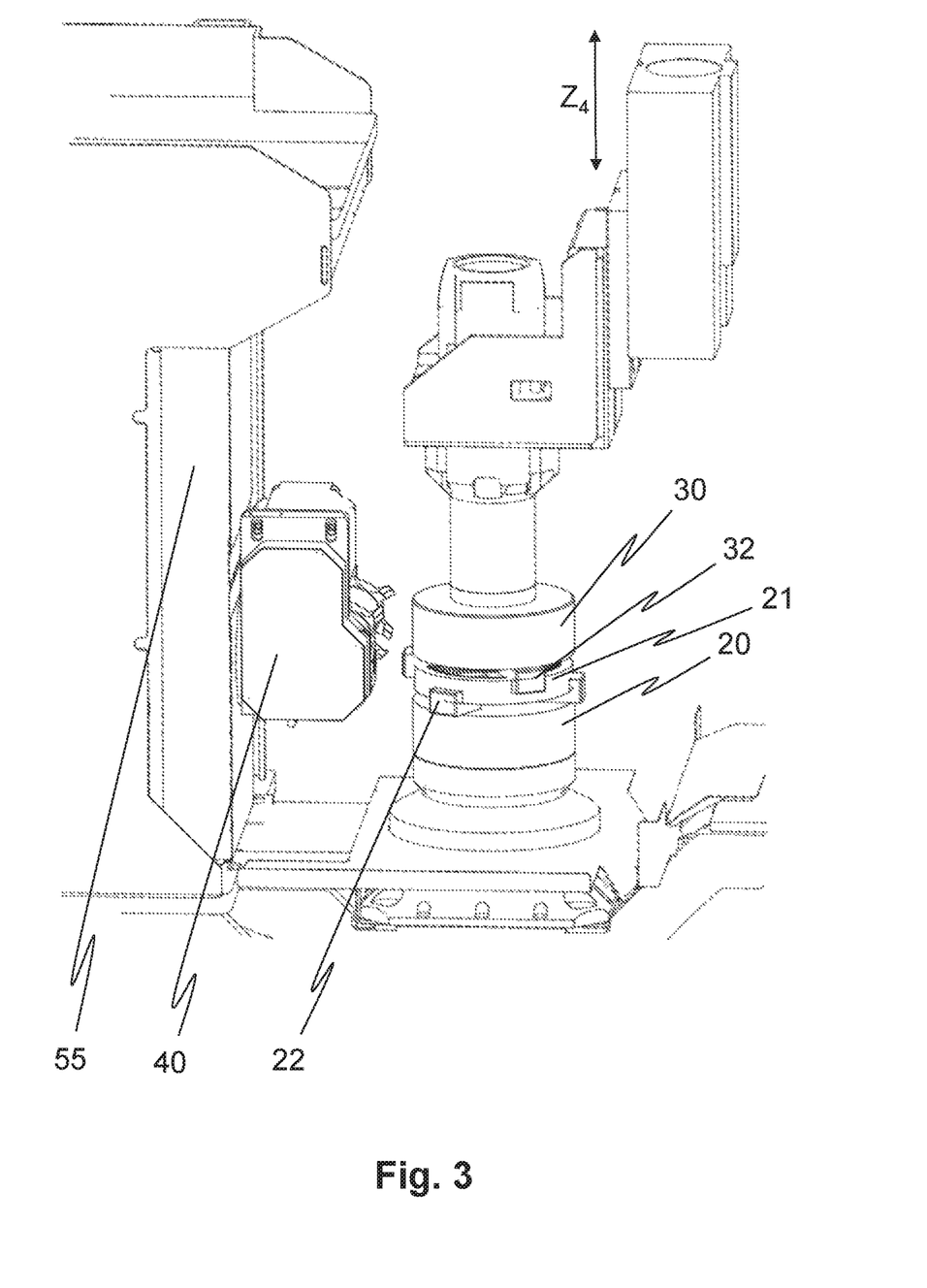
FIG. 3: the change of the workpiece from the first workpiece holder to the second workpiece holder.

As shown in FIG. 3, the second workpiece holder 30 can hereby be placed onto a workpiece 21 held in the first workpiece holder 20 to grip it and to lift it from the first workpiece holder 20.

The workpiece holders 20 and 30 have clamping jaws 22 and 32 for this purpose that can simultaneously engage at the workpiece 21. Once the second workpiece holder 30 has been lowered onto the workpiece 21 and the workpiece has been secured at the second workpiece holder 30 via the clamping jaws 32, the clamping jaws 22 of the first workpiece holder 20 are therefore released to release the workpiece 21.

The position of the gearing of the workpiece 21 held in the second workpiece holder relative to the second workpiece holder 30 is possibly calculated during the transfer from the known position of the gearing of the workpiece 21 relative to the first workpiece holder 20 and from the relative position between the first and second workpiece holders 20 and 30. A sensor for threading and/or meshing the chamfer hob into the gearing of the workpiece 21 held at the second workpiece holder 30 is therefore not necessary.

After the lifting of the workpiece that is held in the second workpiece holder 30 via the Z4 axis, a machining of the edge of the gearing on the lower side of the workpiece 21 can take place as shown in FIG. 4.

The Z4 axis is realized via a slide 70 in the embodiment that is travelable at a guide rail 80 and that carries the second workpiece holder 30.

The apparatus in accordance with the disclosure is designed such that a workpiece held in the first or second workpiece holders is respectively machined in accordance with the first aspect of the gearing. At least one chamfer hob held in the tool holder is arranged for this purpose via the tool arbor in the region of the center opening of the workpiece, with the tool arbor extending above or below the workpiece from an outer region to the inner region of the workpiece.

Two chamfer hobs 11 and 11' that are designed for respectively opposite directions of rotation are also held in the tool holder 10 independently of this procedure. The edges of the gearing on the lower side and on the upper side are accordingly gear manufacturing machined by the chamfer hob 11 or by the chamber hob 11' with respectively opposite directions of rotation of the tool holder. An identical cutting direction hereby results between the chamfer hob and the workpiece both on the upper side and on the lower side of the workpiece.

The method in accordance with the disclosure in accordance with the first aspect of the present disclosure will first be described again in more detail with respect to FIG. 2.

A workpiece 21 is held in the workpiece holder 20 while the chamfer hobs 11 and 11' are arranged together with the tool holder 10 next to the workpiece holder 20 or so far above the workpiece holder 20 that they do not form any interference edges for the changing of the workpiece.

The chamfer hob 11 is then brought into engagement with the edge region of the internal gearing on the upper side of the workpiece 21 held in the workpiece holder 20 by traveling the X3 axis and/or the Z3 axis. If the chamfer hob 11 had previously been arranged next to the workpiece holder 20, the total machining head is moved via the X3 axis toward the workpiece holder 20 until the chamfer hob 11 is located above the center opening of the workpiece 21 having internal gearing. The chamfer hob is then brought into engagement with the edge via the Z3 axis by lowering the machining head to gear manufacture machine it. If the chamfer hob 11 had already been located above the workpiece holder 20, only the lowering via the Z3 axis is required.

The A3 axis and the V3 axis can be used to set the exact position of the chamfer hob relative to the workpiece 21.

After the chamfer machining of the edge of the gearing on the upper side of the workpiece, the machining head is raised via the Z3 axis so that the chamfer hob 11 is moved out of the center opening of the gearing and is then moved next to the workpiece holder 20 by traveling the machining head over the X3 axis or V3 axis.

In accordance with the second aspect of the present disclosure, the second workpiece holder 30 is thereupon lowered to take over the workpiece 21.

After the repeated lifting, a chamfer gear manufacturing machining of the edge of the gearing on the lower side of the workpiece 21 now takes place as is shown in more detail in FIGS. 4 and 5. The chamfer gear manufacturing machining takes place here in the same manner in accordance with the first aspect of the present disclosure as described above, with an opposite direction of rotation with respect to the chamfer machining of the edge on the upper side of the workpiece being selected. The position of the machining head is furthermore accordingly adapted with respect to the larger distance of the chamfer hob 11' to the tool holder 10, possibly by traveling over the V3 axis.

As can be seen from FIGS. 2, 4, and 5, in an embodiment of the machining of an edge of the gearing of the workpiece having internal gearing, only the chamfer hob provided for this purpose is arranged in the region of the center bore of the workpiece; the respective other chamfer hob is in contrast arranged outside the workpiece. The distance of the chamfer hobs 11 and 11' has to be selected as correspondingly large on the common tool arbor 13 for this purpose.

A chamfer cut hob is possibly also configured as a chamfer hob within the framework of the disclosure independently of the specific embodiments. A chamfer cut hob is a disk-shaped deburring tool that has cutting teeth 12 and flutes at the periphery, possibly each having the same peripheral spacing.

The profile of the cutting teeth 12 of the chamfer cut hob is possibly specifically designed for the chamfer machining of the edge of an internal gearing.

The cutting teeth have a helical extent in the peripheral direction. The chamfer cut hob has multiple threads, with one tooth being provided per thread. The cutting edges formed at the side of the teeth at the front in the direction of rotation are, however, disposed on a common circle of rotation. To chamfer an edge with the chamfer cut hob, the rotational movement between the chamfer cut hob and the workpiece is synchronized such that a respective tooth meets a tooth gap of the workpiece.

With a straight-toothed gear, the profile of the cutting edges of the cutting teeth is symmetrical to the center plane of the deburring tool. It is asymmetrical in contrast with the obliquely toothed gear.

For chamfering, the chamfer cut hob 11 is brought into a position such as is shown in FIG. 5. During the machining of the front edges of the tooth grooves, the workpiece 21 and the chamfer cut hob 11 rotate in a predefined speed ratio so that a respective cutting tooth 12 machines the front edges of a tooth groove. It is understood that the chamfer cut hob 11 or the teeth 12 are configured in accordance with the parameters of the gearing of the workpiece 21 so that the desired engagement with the front edges of the tooth grooves can take place.

The apparatus in accordance with the disclosure possibly has a control by which the axes of rotation of the tool holder and the workpiece holder as well as the machine axes are controlled to adjust the relative position between the tool holder and the workpiece holder. The control possibly controls the apparatus in accordance with the disclosure automatically. It is possibly programmed such that the methods or manners of application of the apparatus in accordance with the disclosure described in more detail above are carried out in an automated manner.

The apparatus in accordance with the disclosure for chamfering workpieces can be used in a machining center in combination with a gear cutting machine that generates the gearing at the workpiece beforehand. The gear cutting machine can, for example, be a gear hobbing machine for machining internal gearings or a chamfer cut deburring device or a skiving machine which are suitable for manufacturing internal gearings.

The gear cutting machine and the apparatus in accordance with the disclosure can each have separate workpiece holders, with a workpiece changer being provided to transport the workpieces from the gear cutting machine to the apparatus for chamfering in accordance with the disclosure. Alternatively, the workpieces can remain clamped on a workpiece holder and can be transported on the workpiece holder from the gear cutting machine to the apparatus in accordance with the disclosure.

Figure 6:
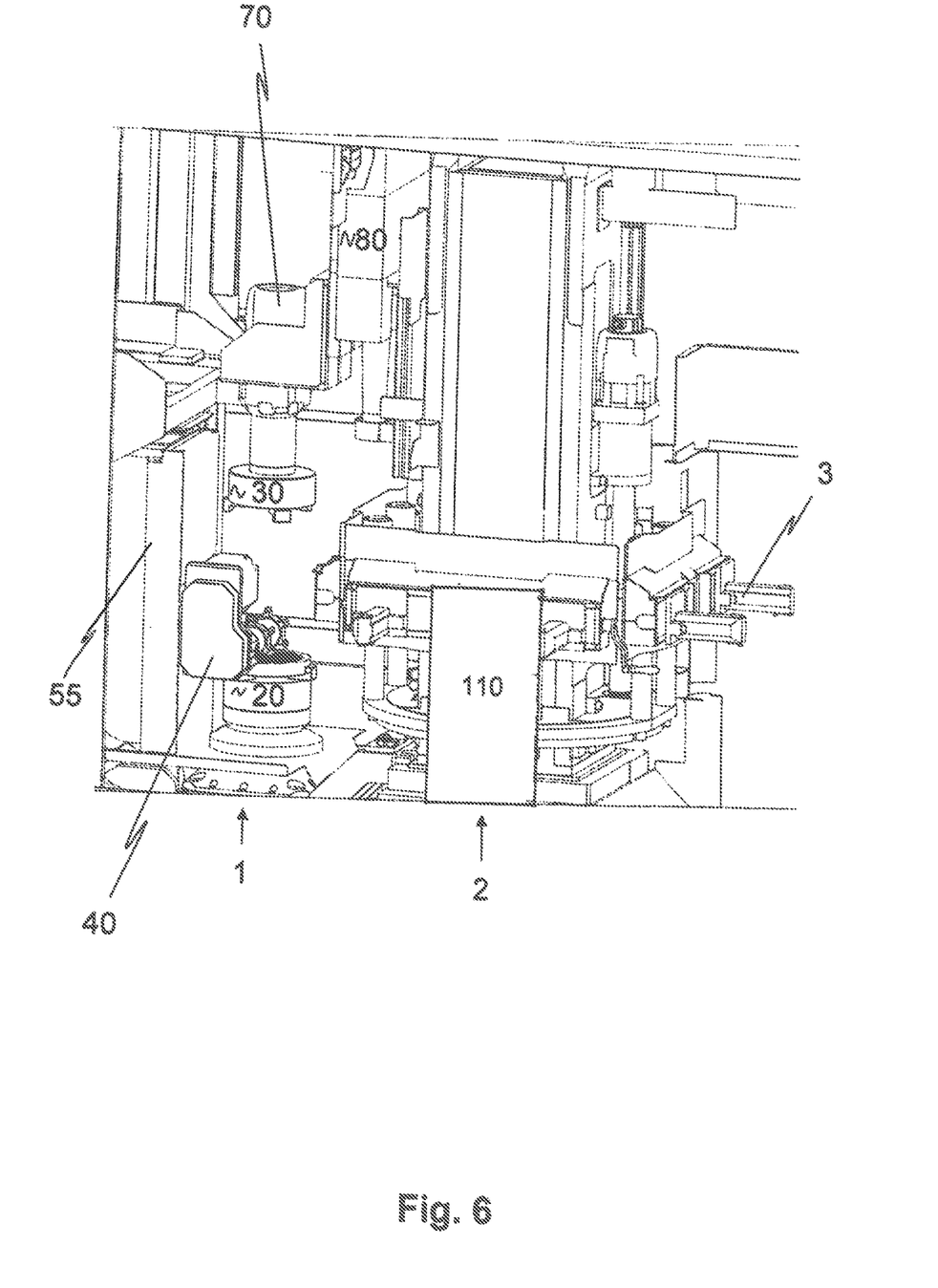
FIG. 6: a gear cutting center in accordance with the disclosure with an apparatus in accordance with the disclosure and with a tool changer.

An embodiment of a gear cutting center is shown in FIG. 6 that comprises an apparatus 1 in accordance with the disclosure in accordance with the embodiment described in more detail above.

The workpiece holder 20 is fixedly associated with the apparatus in accordance with the disclosure in the embodiment and is loaded with workpieces via a ring loader 3. The gear cutting machine 110 schematically shown in FIG. 6 is arranged at a different angular position 2, for example at an angle of 90° to the apparatus 1 in accordance with the disclosure, relative to the ring loader 3. The ring loader 3 can therefore transport workpieces gear manufactured in the gear cutting machine to the apparatus in accordance with the disclosure. The workpieces can optionally also be transported back to the gear cutting machine again, for example to enable a chamfering between a rough machining step and a fine machining step.

The rail 80 via which the Z4 axis for traveling the second workpiece holder 30 is provided is arranged in the embodiment at a machine column that also carries the ring loader 3. The machining head 40 is in contrast arranged in a position opposite the ring loader.

The invention claimed is:

1. An apparatus for chamfering at least one edge of an internal gearing of a workpiece, the workpiece comprising an annular region having at least a first annular front side surface, the first annular front side surface being an upper or lower front side surface, and an inner surface surrounding a center opening of the workpiece, the internal gearing being arranged on the inner surface of the annular region, and the edge extending between the first annular front side surface and the inner surface of the annular region, the apparatus comprising:

at least one rotatably supported workpiece holder for holding the workpiece, at least one rotatably supported tool holder for holding a tool arbor on which at least one chamfer hob is arranged, and machine axes for moving the tool holder relative to the workpiece holder, and a controller for automatic control of the machine axes for chamfering the edge of the gearing, wherein the controller is configured such that during chamfering machining of the workpiece, the tool holder is arranged relative to the workpiece holder by the machine axes such that the tool holder is arranged at a first position outside of an inner circumference of the workpiece and the tool arbor extends above or below the first annular front side surface of the annular region from the first position to a second position inside of the inner circumference of the workpiece and the chamfer hob is arranged by the tool arbor in the center opening of the workpiece and brought into engagement with the edge of the internal gearing.

2. The apparatus of claim 1, wherein the controller is configured such that during chamfering the tool holder is arranged on an outer side of the workpiece and the tool arbor extends, starting from the tool holder, past the annular region of the workpiece, to the area of the center opening of the workpiece.

3. The apparatus of claim 1, wherein the chamfer hob arranged at the tool arbor is accessible from a lower side and/or from an upper side; and/or wherein the tool holder is arranged via a machining head at a machine column, with the machining head extending perpendicular to an axis of rotation of the workpiece holder and/or of the tool holder away from the machine column; and/or wherein the tool holder is arranged at the machining head such that it extends in parallel with a front side of the machine column facing the workpiece holder.

4. An apparatus for chamfering at least one edge of a gearing at a front side of a workpiece having internal gearing comprising:
at least one rotatably supported workpiece holder for holding the workpiece,
at least one rotatably supported tool holder for holding at least one chamfer hob,
machine axes for moving the tool holder relative to the workpiece holder, and
a controller for automatic control of the machine axes for chamfering edges of the gearing, wherein the controller is configured such that the tool holder is arranged next to the workpiece held in the workpiece holder and the chamfer hob held in the tool holder is arranged during chamfering by a tool arbor in a region of a center opening of the workpiece formed by the internal gearing and brought into engagement with the edge of the internal gearing on at least one out of an upper side and a lower side of the workpiece,
wherein the rotatably supported workpiece holder is a first rotatably supported workpiece holder, wherein the apparatus comprises a second rotatably supported workpiece holder for holding the workpiece, with the edge of the gearing being chamfer machinable on a first front side of the workpiece while the workpiece is held in the first workpiece holder and an edge on a second front side of the workpiece being chamfer machinable while the workpiece is held in the second workpiece holder.

5. The apparatus of claim 4, wherein the apparatus has a machining head that is travelable over the machine axes and that serves the chamfer machining of the edge of the gearing both on the first front side and on the second front side, with the tool holder being arranged at the machining head and/or with the chamfer machining of the edge of the gearing on the first and second front sides taking place via the same chamfer hob or via a plurality of chamfer hobs held in the same tool holder.

6. The apparatus of claim 4, having an apparatus for changing the workpiece between the first workpiece holder to the second workpiece holder, with at least one of the two workpiece holders being travelable to grip the workpiece held in the other workpiece holder and/or with a workpiece changer being provided for traveling the workpiece from the one workpiece holder to the other workpiece holder.

7. The apparatus of claim 4, wherein the two workpiece holders are arranged or arrangeable on two oppositely disposed sides of a work region, with the first or second front side of the workpiece facing the work region depending on the workpiece holder in which it is held.

8. The apparatus of claim 4, wherein the two workpiece holders are arranged coaxially.

9. The apparatus of claim 4, wherein the tool holder is arranged and/or arrangeable next to the two workpiece holders and at least one chamfer hob is arrangeable by the tool arbor above the center opening of the workpiece formed by the internal gearing when said workpiece is arranged in the first workpiece holder to be brought into engagement with the edge of the gearing on the upper side of the workpiece and is arrangeable by the tool arbor beneath the center opening formed by the internal gearing when it is arranged in the second workpiece holder to be brought into engagement with the edge of the gearing on the lower side of the workpiece, with the same tool holder being used for the chamfer machining of the edges of the gearing on the upper side and on the lower side.

10. The apparatus of claim 9, wherein separate chamfer hobs, arranged on the same tool arbor, are used for machining the edge of the gearing on the upper side and on the lower side.

11. The apparatus of claim 9, wherein the same chamfer hob is used for machining the edge of the gearing on the upper side and on the lower side that is brought into engagement with an edge region of the gearing on a first side of the workpiece in a first radial direction with respect to an axis of rotation of the first workpiece holder and, after the change of the workpiece into the second workpiece holder by traveling the tool holder in a second radial direction with respect to an axis of rotation of the second workpiece holder, is brought into engagement with a radially oppositely disposed edge region of the gearing on a second side of the workpiece.

12. The apparatus of claim 9, wherein the one or more chamfer hobs arranged on the tool arbor are accessible from two sides to be able to be brought into engagement with an edge of the workpiece.

13. The apparatus of claim 4, further comprising the controller for the automatic control of the machine axes for chamfering the edges of the gearing on both front sides of the workpiece; and/or comprising at least one chamfer cut hob held in the tool holder.

14. A gear manufacturing machining center including the apparatus of claim 1 and further including a gear cutting machine and a workpiece changer with the gear cutting machine for machining internal gearings being a gear hobbing machine or a chamfer cut deburring device or a skiving machine, and/or with gear manufacturing machining and chamfering of workpieces taking place with parallel cycle times, and/or with the workpiece changer being a ring automation and the apparatus and the gear cutting machine being arranged at different angular positions of the ring automation.

15. A method of chamfering at least one edge of an internal gearing of a workpiece,
the workpiece comprising:
an annular region having at least a first annular front side surface, the first annular front side surface being an upper or lower front side surface, and
an inner surface surrounding a center opening of the workpiece, the internal gearing being arranged on the inner surface of the annular region, and the edge extending between the first annular front side surface and the inner surface of the annular region,
the method using an apparatus comprising:
at least one rotatably supported workpiece holder for holding the workpiece,
the chamfering performed by at least one chamfer hob arranged on a tool arbor held in a rotatably supported tool holder,
the method comprising the step of: during chamfering machining of the workpiece, arranging the tool holder relative to the workpiece held in the workpiece holder such that the tool holder is arranged at a first position outside of an inner circumference of the workpiece and the tool arbor extends above or below the first annular front side surface of the annular region from the first position to a second position inside of the inner circumference of the workpiece and the chamfer hob is arranged via the tool arbor in the center opening of the workpiece and brought into engagement with the edge of the internal gearing.

16. The method of claim 15, wherein the edge of the internal gearing is chamfer machined on a first front side of the workpiece while the workpiece is held in a first workpiece holder and the edge of the internal gearing on a second front side of the workpiece is chamfer machined while the workpiece is held in a second workpiece holder.

17. The method of claim 15, including the use of a chamfer cut hob.

18. The apparatus of claim 1, wherein the chamfer hob is a chamfer cut hob.

19. The apparatus of claim 1, the machine axes comprising at least a first linear axis for travelling the tool holder in a direction parallel with an axis of rotation of the workpiece holder.

20. The apparatus of claim 19, the machine axes further comprising a second linear axis for travelling the tool holder in a direction perpendicular to the axis of rotation of the workpiece holder and to an axis of rotation of the tool holder and a third linear axis for shifting the tool holder in the direction of its axis of rotation or for travelling the tool holder in a direction perpendicular to the first axis and the second axis.

21. The apparatus of claim 1, wherein during chamfering, an axis of rotation of the tool extends in a plane that is essentially orthogonal to an axis of rotation of the workpiece.

* * * * *